(12) United States Patent
Boulter et al.

(10) Patent No.: US 7,711,838 B1
(45) Date of Patent: May 4, 2010

(54) INTERNET RADIO AND BROADCAST METHOD

(75) Inventors: Jeffrey R. Boulter, Los Angeles, CA (US); Todd M. Beaupre, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 888 days.

(21) Appl. No.: 09/709,234

(22) Filed: Nov. 9, 2000

Related U.S. Application Data

(60) Provisional application No. 60/164,846, filed on Nov. 10, 1999.

(51) Int. Cl.
*G06F 15/16* (2006.01)

(52) U.S. Cl. ........................................ 709/231

(58) Field of Classification Search ................. 709/226, 709/231, 203, 217, 200, 219, 225; 705/5, 705/10, 12
See application file for complete search history.

(56) References Cited

U.S. PATENT DOCUMENTS

| | | | |
|---|---|---|---|
| 3,568,156 A | 3/1971 | Thompson | |
| 4,384,329 A | 5/1983 | Rosenbaum | |
| 4,833,610 A | 5/1989 | Zamora | |
| 4,996,642 A | 2/1991 | Hey | |
| 5,062,143 A | 10/1991 | Schmitt | |
| 5,182,708 A | 1/1993 | Ejiri | |
| 5,241,674 A | 8/1993 | Kuorsawa | |
| 5,303,150 A | 4/1994 | Komeda | |
| 5,303,302 A | 4/1994 | Burrows | |
| 5,371,807 A | 12/1994 | Register | |
| 5,392,212 A | 2/1995 | Geist | |
| 5,404,505 A | 4/1995 | Levinson | |
| 5,418,951 A | 5/1995 | Damashek | |
| 5,497,488 A | 3/1996 | Akizawa | |

(Continued)

FOREIGN PATENT DOCUMENTS

AU      A53031/98      2/1997

(Continued)

OTHER PUBLICATIONS

Musicmatch archived webpages.*

(Continued)

*Primary Examiner*—J Bret Dennison
(74) *Attorney, Agent, or Firm*—James J. DeCarlo; Greenberg Traurig, LLP

(57) ABSTRACT

Data streams are selected according to user preferences and transmitted to the user. Such data streams may be audio, video, or other works, such as popular music or the like, or other works, including music videos. Users may indicate their general or specific preferences with reaard to song, artists, or albums. Other users, particularly ones who access the system often, can act as influencers or controllers of the music transmitted to the user. Any other aspects or factors that might affect the user's preferences can be taken into account, such as popular radio stations in the United States or anywhere in the world. A playlist can be created that combines all of these factors, as well as any applicable statutory regulations. The playlist serves as a basis for feeding the data streams to the user, and the user can enjoy music generally of their choosing, while additionally being exposed to new music (if the user so prefers). An Internet radio is established. Each user can express their own preferences and receive music corresponding to those preferences on an on-going basis. Every individual can be the manager of their own radio station that broadcasts music that parallels the user's tastes. Other users may also choose to hear the same playlist as another individual, or allow that individual to influence their playlist.

36 Claims, 3 Drawing Sheets

U.S. PATENT DOCUMENTS

| | | | |
|---|---|---|---|
| 5,499,046 A * | 3/1996 | Schiller et al. | 725/146 |
| 5,539,635 A | 7/1996 | Larson, Jr. | 364/401 R |
| 5,548,507 A | 8/1996 | Martino | |
| 5,583,763 A | 12/1996 | Atcheson | |
| 5,592,511 A | 1/1997 | Schoen et al. | 375/220 |
| 5,608,622 A | 3/1997 | Church | |
| 5,616,876 A * | 4/1997 | Cluts | 84/609 |
| 5,661,787 A | 8/1997 | Pocock | 379/101.01 |
| 5,675,786 A | 10/1997 | McKee | |
| 5,678,054 A | 10/1997 | Shibata | |
| 5,704,017 A * | 12/1997 | Heckerman et al. | 706/12 |
| 5,706,365 A | 1/1998 | Rangarajan | |
| 5,708,709 A | 1/1998 | Rose | |
| 5,713,016 A | 1/1998 | Hill | |
| 5,721,827 A | 2/1998 | Logan et al. | 395/200.47 |
| 5,726,909 A | 3/1998 | Krikorian | 364/514 R |
| 5,740,134 A | 4/1998 | Peterson | 369/30 |
| 5,749,081 A * | 5/1998 | Whiteis | 707/102 |
| 5,751,672 A | 5/1998 | Yankowsky | |
| 5,754,938 A | 5/1998 | Herz | |
| 5,758,257 A | 5/1998 | Herz et al. | 455/2 |
| 5,764,235 A | 6/1998 | Hunt | |
| 5,774,357 A | 6/1998 | Hoffberg | |
| 5,790,423 A | 8/1998 | Lau et al. | 364/514 R |
| 5,790,935 A | 8/1998 | Payton | |
| 5,794,207 A | 8/1998 | Walker et al. | |
| 5,797,127 A | 8/1998 | Walker et al. | |
| 5,809,246 A | 9/1998 | Goldman | 395/200.47 |
| 5,815,662 A * | 9/1998 | Ong | 725/92 |
| 5,819,160 A | 10/1998 | Foladare et al. | 455/45 |
| 5,842,010 A | 11/1998 | Jain | |
| 5,854,901 A * | 12/1998 | Cole et al. | 709/245 |
| 5,862,220 A | 1/1999 | Perlman | |
| 5,862,339 A | 1/1999 | Bonnaure | |
| 5,864,868 A | 1/1999 | Contois | 707/104 |
| 5,872,921 A | 2/1999 | Zahariev | |
| 5,881,234 A | 3/1999 | Schwab | |
| 5,883,986 A | 3/1999 | Kopec | |
| 5,884,312 A | 3/1999 | Dustan | |
| 5,897,620 A | 4/1999 | Walker et al. | |
| 5,898,833 A | 4/1999 | Kidder | |
| 5,913,040 A | 6/1999 | Rakavy et al. | 395/200.62 |
| 5,913,041 A | 6/1999 | Ramanathan | |
| 5,926,207 A | 7/1999 | Vaughan | |
| 5,930,526 A | 7/1999 | Iverson | |
| 5,930,768 A | 7/1999 | Hooban | 705/27 |
| 5,931,901 A * | 8/1999 | Wolfe et al. | 709/206 |
| 5,931,907 A | 8/1999 | Davies | |
| 5,941,951 A * | 8/1999 | Day et al. | 709/233 |
| 5,945,988 A * | 8/1999 | Williams et al. | 345/747 |
| 5,948,061 A | 9/1999 | Merriman et al. | |
| 5,950,189 A | 9/1999 | Cohen | |
| 5,956,482 A | 9/1999 | Agraharam | |
| 5,960,430 A | 9/1999 | Haimowitz | |
| 5,969,283 A * | 10/1999 | Looney et al. | 84/609 |
| 5,974,398 A | 10/1999 | Hanson et al. | |
| 5,977,964 A | 11/1999 | Williams et al. | 345/327 |
| 5,983,176 A | 11/1999 | Hoffert | |
| 5,987,525 A | 11/1999 | Roberts et al. | 709/248 |
| 5,996,015 A * | 11/1999 | Day et al. | 709/226 |
| 6,000,008 A | 12/1999 | Simcoe | |
| 6,005,603 A * | 12/1999 | Flavin | 725/32 |
| 6,006,257 A | 12/1999 | Slezak | |
| 6,009,382 A | 12/1999 | Martino | |
| 6,012,098 A | 1/2000 | Bayeh | |
| 6,020,883 A * | 2/2000 | Herz et al. | 715/721 |
| 6,021,203 A | 2/2000 | Douceur | |
| 6,026,398 A * | 2/2000 | Brown et al. | 707/5 |
| 6,026,439 A * | 2/2000 | Chowdhury et al. | 709/223 |
| 6,029,195 A * | 2/2000 | Herz | 725/116 |
| 6,031,795 A | 2/2000 | Wehmeyer | |
| 6,031,797 A | 2/2000 | Van Ryzin et al. | 369/33 |
| 6,035,268 A | 3/2000 | Carus | |
| 6,038,527 A | 3/2000 | Renz | |
| 6,038,591 A | 3/2000 | Wolfe et al. | 709/206 |
| 6,044,376 A | 3/2000 | Kurtzman, II | |
| 6,047,251 A | 4/2000 | Pon | |
| 6,047,268 A | 4/2000 | Bartoli | |
| 6,047,320 A | 4/2000 | Tezuka | |
| 6,047,327 A | 4/2000 | Tso | |
| 6,049,777 A * | 4/2000 | Sheena et al. | 705/10 |
| 6,052,717 A | 4/2000 | Reynolds et al. | 709/218 |
| 6,061,680 A | 5/2000 | Scherf | |
| 6,064,980 A | 5/2000 | Jacobi | |
| 6,065,051 A | 5/2000 | Steele | |
| 6,065,058 A | 5/2000 | Hailpern | |
| 6,070,185 A | 5/2000 | Anupam | |
| 6,085,242 A | 7/2000 | Chandra | |
| 6,088,722 A * | 7/2000 | Herz et al. | 709/217 |
| 6,092,049 A * | 7/2000 | Chislenko et al. | 705/10 |
| 6,097,719 A | 8/2000 | Benash | |
| 6,102,406 A | 8/2000 | Miles | |
| 6,105,022 A | 8/2000 | Takahashi | |
| 6,112,186 A * | 8/2000 | Bergh et al. | 705/10 |
| 6,131,082 A | 10/2000 | Hargrave | |
| 6,134,532 A | 10/2000 | Lazarus | |
| 6,138,142 A | 10/2000 | Linsk | |
| 6,154,773 A | 11/2000 | Roberts | |
| 6,161,132 A | 12/2000 | Roberts | |
| 6,161,139 A | 12/2000 | Win et al. | |
| 6,167,369 A | 12/2000 | Schulze | |
| 6,182,142 B1 | 1/2001 | Win | |
| 6,185,560 B1 | 2/2001 | Young | |
| 6,192,340 B1 * | 2/2001 | Abecassis | 704/270 |
| 6,199,076 B1 * | 3/2001 | Logan et al. | 715/501.1 |
| 6,205,126 B1 | 3/2001 | Moon | |
| 6,222,980 B1 | 4/2001 | Asai | |
| 6,225,546 B1 | 5/2001 | Kraft | |
| 6,230,192 B1 | 5/2001 | Roberts | |
| 6,230,207 B1 | 5/2001 | Roberts | |
| 6,240,459 B1 | 5/2001 | Roberts | |
| 6,246,672 B1 | 6/2001 | Lumelsky | |
| 6,249,810 B1 | 6/2001 | Kiraly | |
| 6,252,988 B1 | 6/2001 | Ho | |
| 6,263,313 B1 | 7/2001 | Milsted | |
| 6,272,456 B1 | 8/2001 | de Campos | |
| 6,272,495 B1 | 8/2001 | Hetherington | |
| 6,282,548 B1 | 8/2001 | Burner | |
| 6,292,795 B1 | 9/2001 | Peters | |
| 6,298,446 B1 | 10/2001 | Schreiber | |
| 6,314,421 B1 | 11/2001 | Sharnoff | |
| 6,317,761 B1 | 11/2001 | Landsman | |
| 6,321,205 B1 | 11/2001 | Eder | |
| 6,321,221 B1 | 11/2001 | Bieganski | |
| 6,330,592 B1 * | 12/2001 | Makuch et al. | 709/217 |
| 6,330,593 B1 | 12/2001 | Roberts | |
| 6,334,127 B1 * | 12/2001 | Bieganski et al. | 707/5 |
| 6,343,317 B1 | 1/2002 | Glorikian | |
| 6,349,339 B1 * | 2/2002 | Williams | 709/229 |
| 6,353,849 B1 | 3/2002 | Linsk | |
| 6,370,315 B1 | 4/2002 | Mizuno | |
| 6,370,513 B1 | 4/2002 | Kolawa | |
| 6,389,467 B1 | 5/2002 | Eyal | |
| 6,405,203 B1 | 6/2002 | Collart | |
| 6,415,327 B1 | 7/2002 | Beckerman et al. | |
| 6,430,539 B1 | 8/2002 | Lazarus | |
| 6,434,535 B1 | 8/2002 | Kupka | |
| 6,438,579 B1 | 8/2002 | Hosken | 709/203 |
| 6,487,598 B1 | 11/2002 | Valencia | |
| 6,490,553 B2 | 12/2002 | Van Thong | |
| 6,505,160 B1 | 1/2003 | Levy | |
| 6,512,763 B1 | 1/2003 | DeGolia, Jr. | |
| 6,513,061 B1 | 1/2003 | Ebata | |
| 6,522,769 B1 | 2/2003 | Rhoads | |

| | | | | | | |
|---|---|---|---|---|---|---|
| 6,526,411 B1 | 2/2003 | Ward | | 2002/0152204 A1 | 10/2002 | Ortega |
| 6,526,580 B2* | 2/2003 | Shimomura et al. ........... 725/63 | | 2002/0175941 A1 | 11/2002 | Hand |
| 6,532,477 B1 | 3/2003 | Tang | | 2003/0002608 A1 | 1/2003 | Glenn |
| 6,535,854 B2 | 3/2003 | Buchner | | 2003/0007507 A1 | 1/2003 | Rajwan |
| 6,538,996 B1 | 3/2003 | West | | 2003/0028796 A1 | 2/2003 | Roberts |
| 6,546,421 B1* | 4/2003 | Wynblatt et al. ............. 709/225 | | 2003/0046283 A1 | 3/2003 | Roberts |
| 6,557,026 B1 | 4/2003 | Stephens, Jr. | | 2003/0083871 A1 | 5/2003 | Foote |
| 6,557,042 B1* | 4/2003 | He et al. ...................... 709/231 | | 2003/0093476 A1 | 5/2003 | Syed |
| 6,560,403 B1 | 5/2003 | Tanaka | | 2003/0133453 A1 | 7/2003 | Makishima |
| 6,560,704 B2 | 5/2003 | Dieterman | | 2003/0135513 A1 | 7/2003 | Quinn |
| 6,587,127 B1 | 7/2003 | Leeke | | 2003/0139989 A1 | 7/2003 | Churquina |
| 6,611,812 B2 | 8/2003 | Hurtado | | 2003/0165200 A1 | 9/2003 | Pugel |
| 6,611,813 B1 | 8/2003 | Bratton | | 2003/0182139 A1 | 9/2003 | Harris |
| 6,614,914 B1 | 9/2003 | Rhoads | | 2003/0190077 A1 | 10/2003 | Ross |
| 6,614,987 B1* | 9/2003 | Ismail et al. ................... 386/83 | | 2003/0206558 A1 | 11/2003 | Parkkinen |
| 6,615,039 B1* | 9/2003 | Eldering ...................... 455/418 | | 2004/0090462 A1* | 5/2004 | Graham ....................... 345/767 |
| 6,615,208 B1 | 9/2003 | Behrens | | 2004/0103372 A1* | 5/2004 | Graham ....................... 715/513 |
| 6,655,963 B1 | 12/2003 | Horvitz | | 2005/0149759 A1 | 7/2005 | Vishwanath |
| 6,657,117 B2 | 12/2003 | Weare | | 2005/0216942 A1* | 9/2005 | Barton ......................... 725/97 |
| 6,658,151 B2 | 12/2003 | Lee | | 2006/0149813 A1* | 7/2006 | Janik ........................... 709/203 |
| 6,677,894 B2 | 1/2004 | Sheynblat | | 2006/0206478 A1* | 9/2006 | Glaser et al. ................... 707/5 |
| 6,725,446 B1 | 4/2004 | Hahn | | 2006/0212442 A1* | 9/2006 | Conrad et al. .................. 707/5 |
| 6,741,980 B1 | 5/2004 | Langseth | | 2006/0212444 A1* | 9/2006 | Handman et al. ............... 707/5 |
| 6,757,740 B1 | 6/2004 | Parekh | | | | |
| 6,807,632 B1 | 10/2004 | Carpentier | | FOREIGN PATENT DOCUMENTS | | |
| 6,889,383 B1 | 5/2005 | Jarman | | | | |
| 6,925,441 B1 | 8/2005 | Jones, III | | EP | 01/73639 | 5/1986 |
| 6,952,523 B2 | 10/2005 | Tanaka | | EP | 0 643 359 A2 | 3/1995 |
| 6,963,899 B1* | 11/2005 | Fernandez et al. ........... 709/203 | | EP | 0 751 471 A | 1/1997 |
| 7,003,515 B1* | 2/2006 | Glaser et al. ...................... 707/5 | | EP | 1010098 B1 | 4/1998 |
| 7,010,537 B2* | 3/2006 | Eyal et al. .................... 707/100 | | EP | 1324567 A2 | 4/1998 |
| 7,072,846 B1* | 7/2006 | Robinson ...................... 705/10 | | EP | 0 847 156 A2 | 6/1998 |
| 7,081,579 B2* | 7/2006 | Alcalde et al. ................. 84/608 | | EP | 0 860 785 A | 8/1998 |
| 7,085,845 B2* | 8/2006 | Woodward et al. .......... 709/231 | | EP | 0955592 A2 | 4/1999 |
| 7,115,808 B2* | 10/2006 | Lu et al. ......................... 84/611 | | EP | 1 050 833 A2 | 8/2000 |
| 7,133,924 B1* | 11/2006 | Rosenberg et al. .......... 709/231 | | EP | 1 050 830 A2 | 11/2000 |
| 7,146,627 B1* | 12/2006 | Ismail et al. ................... 725/27 | | EP | 1236354 | 9/2002 |
| 7,155,734 B1* | 12/2006 | Shimomura et al. ........... 725/81 | | GB | 2306869 | 11/1995 |
| 7,158,531 B2* | 1/2007 | Barton ......................... 370/442 | | JP | 2001202368 | 7/2001 |
| 7,167,895 B1* | 1/2007 | Connelly ..................... 709/203 | | JP | 2001521642 | 11/2001 |
| 7,228,305 B1* | 6/2007 | Eyal et al. .................... 707/100 | | WO | WO 97/07467 | 2/1997 |
| 7,243,129 B1* | 7/2007 | Thomas ....................... 709/207 | | WO | WO 98/25269 | 6/1998 |
| 7,363,314 B2* | 4/2008 | Picker et al. ................. 707/102 | | WO | WO 98/33135 A | 7/1998 |
| 7,396,990 B2* | 7/2008 | Lu et al. ......................... 84/611 | | WO | WO 98/47080 | 10/1998 |
| 2001/0005823 A1 | 6/2001 | Fischer | | WO | WO 99/27681 | 6/1999 |
| 2001/0013123 A1* | 8/2001 | Freeman et al. ............... 725/34 | | WO | WO 99/43111 | 8/1999 |
| 2001/0042107 A1 | 11/2001 | Palm | | WO | WO 00/04474 A | 1/2000 |
| 2001/0042109 A1 | 11/2001 | Bolas | | WO | WO 00/46681 A1 | 2/2000 |
| 2001/0044855 A1 | 11/2001 | Vermeire | | WO | WO 00/31964 | 6/2000 |
| 2001/0052028 A1 | 12/2001 | Roberts | | WO | WO 01/33379 A1 | 10/2000 |
| 2001/0055276 A1 | 12/2001 | Rogers | | WO | WO 01/35667 A1 | 11/2000 |
| 2002/0002039 A1 | 1/2002 | Qureshey | | WO | WO 01/54323 A2 | 1/2001 |
| 2002/0004839 A1 | 1/2002 | Wine | | WO | WO 01/73639 A1 | 10/2001 |
| 2002/0007418 A1 | 1/2002 | Hegde | | WO | WO 02/42862 A2 | 5/2002 |
| 2002/0010621 A1 | 1/2002 | Bell | | WO | WO 02/65341 A2 | 8/2002 |
| 2002/0010714 A1 | 1/2002 | Hetherington | | WO | WO 02/65341 A3 | 8/2002 |
| 2002/0010789 A1 | 1/2002 | Lord | | WO | WO 03/012695 A2 | 2/2003 |
| 2002/0013852 A1 | 1/2002 | Janik | | | | |
| 2002/0016839 A1 | 2/2002 | Smith | | OTHER PUBLICATIONS | | |
| 2002/0026499 A1* | 2/2002 | Cantone et al. .............. 709/219 | | | | |
| 2002/0035561 A1 | 3/2002 | Archer | | | | |
| 2002/0045717 A1 | 4/2002 | Grenda | | | | |
| 2002/0049717 A1* | 4/2002 | Routtenberg et al. ............ 707/1 | | | | |
| 2002/0054087 A1* | 5/2002 | Noll et al. .................... 345/744 | | | | |
| 2002/0056004 A1 | 5/2002 | Smith | | | | |
| 2002/0056100 A1* | 5/2002 | Shimomura et al. ........... 725/39 | | | | |
| 2002/0065857 A1 | 5/2002 | Michalewicz | | | | |
| 2002/0082901 A1 | 6/2002 | Dunning | | | | |
| 2002/0095387 A1 | 7/2002 | Sosa | | | | |
| 2002/0099696 A1 | 7/2002 | Prince | | | | |
| 2002/0099737 A1 | 7/2002 | Porter | | | | |
| 2002/0111912 A1 | 8/2002 | Hunter | | | | |
| 2002/0129123 A1 | 9/2002 | Johnson | | | | |

RealNetworks archived webpages.*
Bill Konig, "The College Music Journal names TuneTo.com, CMJ Website of the Week", "http://web.archive.org/web/20000412122646/www.tuneto.com/company/news/cmj120899.html", Apr. 12, 2000.*
Business Wire, Former WebRadio.com Executive to Lead TuneTo.com's Strategic Partnership Development with the Music Industry, "http://findarticles.com/p/articles/mi_m0EIN/is_1999_Oct_19/ai_56527957", Oct. 19, 1999.*
Business Wire, "SpinRecords.com Announces Launch of Internet Music Made Easy", "http://findarticles.com/p/articles/mi_m0EIN/is_2000_April_6/ai_61343598", Apr. 6, 2000.*

Business Wire, Top Execs From Microsoft & RealNetworks to Keynote Kagan Streaming Media Conference Oct. 6-7 in New York, "http://findarticles.com/p/articles/mi_m0EIN/is_1999_0ct_4/ai_55968610", Oct. 4, 1999.*

Shands, Mark, "An Exclusive Interview with Michael Weiss, TuneTo.com","http://web.archive.org/web/20000414081433/www.hitmakers.com/archivedfeats/weiss.html", Apr. 14, 2000.*

Alvear, Jose, "Q&A with Tim Bratton, President of TuneTo.com", "http://web.archive.org/web/20000417161149/www.tuneto.com/company/news/smn112399.html", Nov. 23, 1999.*

Mark Smotroff, "TuneTo.com Seals $2.6 Million Series a Funding", "http://web.archive.org/web/20000606181901/www.tuneto.com/company/news/pr011800.html", Jan. 18, 2000.*

Dennis Michael, "CNN story on downloadable music and Internet radio includes Tim Bratton, President of TuneTo.com", "http://web.archive.org/web/20000229210114/www.tuneto.com/company/news/cnn120299.html" Dec. 2, 1999.*

Business Wire, "Web Radio.com Joins Arbitron InfoStream Webcast Ratings Alliance; Arbitron to Provide Third-Party Measurement to New Web-Based Radio Broadcasting Service", May 6, 1999.*

Philadelphia Inquirer, Deborah Kong, Knight Ridder News Service, "The Internet Can Turn Music Lovers Into DJS", Nov. 4, 1999.*

Business Wire, "Web Radio.com Strengthens Internet Rdio Destination With Content, Community, Commerce and Functionality" Aug. 31, 1999.*

Wikipedia.org, "Music Genome Project" Jun. 3, 2008.*

Ian Goldberg, Steven D. Gribble, David Wagner, and Eric A. Brewer, "The Ninja Jukebox," *Proceedings of USITS' 99: The 2nd USENIX Symposium on Internet Technologies & Systems*, Boulder, Colorado, USA, Oct. 11-14, 1999.

U.S. Appl. No. 60/144,377, filed Jul. 16, 1999, Benjamin E. Hosken.

U.S. Appl. No. 60/165,726, filed Nov. 15, 1999, Sean Michnel Ward.

U.S. Appl. No. 60/165,727, filed Nov. 15, 1999, Sean Michnel Ward.

U.S. Appl. No. 60/166,039, filed Nov. 17, 1999, Sean Michnel Ward.

Adam B. Stubblefield, et al., "A Security Analysis of My.PP3.com and the Beam-it Protocol".

Alan Griffiths, H. Claire Luckhurst and Peter Willett, "Using Interdocument Similarity Information in Document Retrieval Systems," pp. 365-373, John Wiley & Sons, Inc., 1986.

Ben J. Schafer, et al., "Recommender Systems in E-Commerce", Proceedings ACM Conference on Electronic Commerce, pp. 158-166, XP002199598, 1999.

Brian P. McCune, Richard M. Tong, Jeffrey S. Dean, and Daniel G. Shapiro, "RUBRIC: A System for Rule-Based Information Retrieval," pp. 440-445.

C. J. van Rijsbergen, B.Sc., Ph.D., M.B.C.S, "Information Retrieval," Department of Computing Science—University of Glasgow [online], 1979 [retrieved on Aug. 24, 2001] Retrieved from <URL:http://www.dcs.gla.ac.uk/keith/preface.html> (213 pages).

Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.

Charu C. Aggarwal, Cecilia Procopiuc, Joel L. Wolf, Philip S. Yu, and Jong Soo Park, "Fast Algorithm for Projected Clustering;", Proceedings of the ACM SIGMOD International Conference on Management of Data, 1999.

Connor Hayes, et al., Smart Radio—a Proposal, Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

Cyril Cleverdon, "The Cranfield Tests on Index Language Devices," presented Apr. 27th 1967, pp. 47-59, Found in: Readings in Information Retrieval, Edited by Karen Sparck Jones and Peter Willett, Morgan Kaufmann Publishers, Inc., San Francisco, CA, 1997.

Cyril W. Cleverdon and J, Mills, "The Testing of Index Language Devices," presented Feb. 5, 1963, Chapter 3—Key Concepts, pp. 98-110, Found in: Readings in Information Retrieval, Edited by Karen Sparck Jones and Peter Willett, Morgan Kaufmann Publishers, Inc., San Francisco, CA, 1997.

David A. Hull and Gregory Grefenstette, "Querying Across Languages: A Dictionary-Based Approach to Multilingual Information Retrieval," pp. 484-492.

David Nichols, et al., Recommendation and Usage in the Digital Library, Technical Report Ref. CSEG/2/I997, Online! 1997, pp. 1-15, XP002279577, Retrieved from the Internet <URL:ftp://ftp.comp.lancs.ac.uk/pub/reports/1997/CSEG.2.97.pdf>, retrieved on May 7, 2004.

E. Michael Keen, "Presenting Results of Experimental Retrieval Comparisons," Department of Information & Library Studies, University College of Wales, Aberystwyth, Sy23 3AS U.K., pp. 217-222.

Erling Wold, Thom Blum, Douglas Keislar, and James Wheaton, "Content-Based Classification, Search, and Retrieval of Audio," IEEE MultiMedia, Fall 1996.

F.W. Lancaster, "MEDLARS: Report on the Evaluation of Its Operating Efficiency," pp. 223-246.

Gerard Salton and C. Buckley, "Term-Weighting Approaches in Automatic Text Retrieval," (received Nov. 19, 1987; accepted in final form Jan. 26, 1988), Department of Computer Science, Cornell University, Ithaca, NY.

Gerard Salton and M. E. Lesk, "Computer Evaluation of Indexing and Text Processing," pp. 60-84, Found in: Readings in Information Retrieval, Edited by Karen Sparck Jones and Peter Willett, Morgan Kaufmann Publishers, Inc., San Francisco, CA, 1997.

Gerard Salton and M.J. McGill, "The SMART and SIRE Experimental Retrieval Systems," pp. 381-399.

Gerard Salton and Michael J. McGill, "Introduction to Modern Information Retrieval," Computer Science Series, pp. 1-435, 1983 by McGraw-Hill, Inc., McGraw-Hill Book Company, USA.

Gerard Salton, A. Wong and C.S. Yang, "A Vector Space Model for Automatic Indexing," Cornell University, pp. 273-280.

Gerard Salton, James Allan, Chris Buckley and Amit Singhal, "Automatic Analysis, Theme Generation, and Summarization of Machine-Readable Texts," pp. 478-483.

Ian H. Witten and Eibe Frank, "Data Mining, Practical Machine Learning Tools and Techniques with JAVA Implementations", Academic Press, pp. 57-76.

Internet Papers: Freetantrum: Songprint 1.2, and computer code; www.freetantrum.org.

Jean Tague-Sutcliffe, "The Pragmatics of Information Retrieval Experimentation Revisited," School of Library and Information Science, University of Western Ontario, Canada, pp. 205-216.

Karen Sparck Jones and Peter Willett (Editors), Chapter 3—"Key Concepts," pp. 85-92 Found in: Readings in Information Retrieval, Morgan Kaufmann Publishers, Inc., San Francisco, CA, 1997.

Karen Sparck Jones, G.J.F. Jones, J.T. Foote, and S.J. Young, "Experiments in Spoken Document Retrieval," pp. 493-502.

Karen Sparck Jones, "Search Term Relevance Weighting Given Little Relevance Information," pp. 329-338, (originally located in Journal of Documentation, vol. 35, No. 1; Mar. 1979, pp. 30-48).

Lauren B. Doyle, "Indexing and Abstracting by Association—Part 1," pp. 25-38, Santa Monica, CA, Found in: Readings in Information Retrieval, Edited by Karen Sparck Jones and Peter Willett, Morgan Kaufmann Publishers, Inc., San Francisco, CA, 1997.

Lisa F. Rau, "Conceptual Information Extraction and Retrieval from Natural Language Input," Artificial Intelligence Program GE Research and Development Center, Schenectady, NY 12301, pp. 527-533.

M. Agosti, G. Gradenigo, P.G. Marchetti, "A Hypertext Environment for Interacting with Large Textual Databases," pp. 469-477.

M. F. Porter, "An Algorithm for Suffix Stripping," Computer Laboratory, Corn Exchange Street, Cambridge, 313-316.

M.E. Maron and J.L. Kuhns, "On Relevance, Probabilistic Indexing and Information Retrieval," pp. 39-46, Found in: Readings in Information Retrieval, Edited by Karen Sparck Jones and Peter Willett, Morgan Kaufmann Publishers, Inc., San Francisco, CA, 1997.

MusicMatch Literature downloaded from web.archive.org—7 pages total.

N.J. Belkin, R.N. Oddy, H.M. Brooks, "The Journal of Documentation", pp. 299-304, vol. 38, No. 2, Jun. 1982.

RealNetworks Literature downloaded from web.archive.org—16 pages total.

R. Brody, Ph.D., "The Conditions and Consequences of Profiling in Commercial and Governmental Settings," Technology and Society, ISTAS 98. Wiring The World: The Impact of Information Technology on Society, Proceedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *The whole document*.

S.E Robertson, "The Probability Ranking Principle In 1R," School of Library, Archive, Information Studies, University College of London, pp. 281-286.

S.E. Robertson and S. Walker, "Some Simple Effective Approximations to the 2—Poisson Model for Probabilistic Weighted Retrieval," Centre for Interactive Systems Research, Department of Information Science, City University, Northampton Square, London, ECIV OHB, U.K., pp. 345-354.

Shoshana Loeb, "Architecting Personalized Delivery of Multimedia Information", Communications of the ACM, vol. 25, No. 12, Dec. 1992, pp. 39-50, XP002102709.

Tej Shah, "Improving Electronic Commerce Through Gathering Customer Data", TCC402 [online] Apr. 23, 1998 XP002379874, University of Virginia, USA, Retrieved from the Internet: <URL:http://www.lib.virginia.edu> [Retrieved on May 8, 2006] *The whole document*.

Thomas Hoffman, et al., "Latent Class Models for Collaborative Filtering", Proceedings of The Sixteenth International Joint Conference on Artificial Intelligence, IJCAI 99, Stockholm, Sweden, Jul. 31-Aug. 6, 1999, Online! pp. 688-693, XPOO2279578, Retrieved from the Internet <URL:http:/Avww.cs.brown.edu/(th/papers/HofmannPuzicha-IJCA199.pdf>, retrieved on May 7, 2004.

Tomek Strzalkowski, "Robust Text Processing in Automated Information Retrieval," Courant Institute of Mathematical Sciences, pp. 317-322.

Unjung Nam, Lectures: "Mel-Frequency Cepstral Analysis," [online] [retrieved on Feb. 2, 2001] Retrieved from the Internet <URL:http://www.ccrma.standford.edu/~unjung/mylec/mfcc.html>, pp. 1-3.

W. B. Croft and D. J. Harper, "Using Probabilistic Models of Document Retrieval Without Relevance Information," Department of Computer & Information Science, University of Massachusetts, pp. 339-344.

W. J. Hutchins, "The Concept of 'Aboutness' in Subject Indexing," presented Apr. 18, 1977, Chapter 3—Key Concepts, pp. 93-97, Found in: Readings in Information Retrieval, Edited by Karen Sparck Jones and Peter Willett, Morgan Kaufmann Publishers, Inc ., San Francisco, CA, 1997.

Z. Liu, et al., "Audio Feature Extraction and Analysis for Scene Segmentation and Classification".

U.S. Appl. No. 60/292,000, filed Feb. 22, 2000, Beckerman, et al.

"How Streaming Media Works," Virginia Tech Faculty Development Workshop, Fall 1999 http://www.fdi.vt.edu/workshops/streaming/howitworks.html.

Supplementary European Search Report (EP 01 95 1043).

Translation of the reasoning of Official Action, Notification of Reasons for Rejection, Date of Issuance—Nov. 27, 2006.

* cited by examiner

INTERNET RADIO AND BROADCAST METHOD

CROSS-REFERENCES TO RELATED APPLICATIONS

This patent application claims the benefit of U.S. Provisional Patent Application Ser. No. 60/164,846 filed Nov. 10, 1999 for Internet Radio and Broadcast Method, which application is incorporated herein by this reference thereto.

BACKGROUND OF THE INVENTION

1. Field of the Invention

This invention relates to Internet media data streams and the like, and more particularly to a copyright-compliant audio/video/radio broadcast system over the Internet where each individual user is able to set his or her preferences regarding works played so as to influence the frequency such works are broadcast to the user.

2. Description of the Related Art

The rise of the Internet has provided many different channels through which media can be presented to users. RealNetworks' RealMedia, Apple QuickTime, and Windows Media all provide players through which live or previously-recorded data streams can be displayed, played back, or broadcast to the individual user. Both audio and video are generally available through these programs and provide a higher and more attractive degree of interactivity with the Internet.

Regular radio broadcasts are based upon a central individual or station broadcasting songs, or other audio information, electromagnetically. Different radio stations are separated by their different carrier frequencies. Amplitude modulation (AM) and frequency modulation (FM) provide two means by which radio broadcast can be effected by a transmitter to a receiver. If an individual wants to affect the songs that are played by the radio station, he or she may write, call, fax, e-mail, or otherwise transmit their preferences to the radio station.

However, one person's preferred music may not be as appreciated by another individual. Music can be very personal, often affecting a person at an emotional level. When the radio station broadcasts a song or other audio signal, all receivers tuned to the carrier frequency pick up the broadcast and either enjoy or suffer the broadcast equally.

It would be much more advantageous to allow each individual to influence, their own set of song playlists. Currently, this is not achievable by wireless broadcast means. However, unique data stream addressing available through Internet data processing might provide means by which an Internet radio could be advantageously affected. Other Internet broadcasting processes are known, but generally follow the known radio station format of broadcasting a single song, or data stream, to all users tuned to the station or channel. In compliance with the Digital Millennium Copyright Act (DMCA), such a radio would have to comply with statutory regulations regarding the broadcast of songs and would generally have to avoid the role of an "on-demand" system, as this might be in violation of statutory regulation.

SUMMARY OF THE INVENTION

The present invention provides a copyright-compliant, broad-based, individually-tailored Internet media broadcast system and method. The present invention provides means by which users may individually rate or indicate music, music videos, or other recorded media that they enjoy hearing from a vast musical or other database. Additionally, such users may also indicate the exclusion of music/media that is to their distaste. In so doing, the user interaction is limited to that decision-making role that is necessary for the user to establish his or her preferences. The Internet radio of the present invention and its method take care of the rest, providing the end user a media or radio channel tailored to his or her own musical tastes. In this way, the present invention can be said to "microcast," or "narrowcast" the content of personalized songlists to individual listening stations or users. As the broadcast uses Internet protocol, each data packet of each data stream has its own individual address, namely, the end-user's data stream player. As the present invention is scalable, thousands, even tens or hundreds of thousands of listeners can be handled by the present invention. With the advance of data-transmission technology, tens or hundreds of millions of users may be served by, or given access to, a system incorporating the present invention, including the delivery of user-preferred data streams by wireless communication links.

Mention is made herein of the present invention with respect to music broadcast to provide a personalized Internet, or data stream, radio. Note should be taken that use of the term "radio," "music," and the like includes any recorded datastream content, including music videos and the like.

At the core of the present invention is the playlist generator. It is the generated songlist that is associated with the user's account and indicates to the system which song is to be played next. Once a song has been selected, it is then streamed as data out to the individual's computer (uniquely identified by Internet protocol). As the central server of the system can handle a large number of users at any one time, it becomes possible to serve each user with his or her own individual data stream. In this case, the data stream comprises audio and/or video information and serves to establish a situation similar to each user having his or her own individual radio station that he or she programs. The list can be created in advance and stored, or generated, in real time when needed. Collaborative filtering techniques may be used in constructing the playlist.

Other applications for the present method may also exist when similar circumstances are present where a large database of information is available that is subject to individual preferences. In a broad sense, the present invention provides means by which individual subsets of an all-encompassing data space may be defined, modified, and preserved, subject to a variety of influences and allowing some serendipitous, or random, events to occur.

OBJECTS OF THE INVENTION

It is an object of the present invention to provide individualized data stream programming according to an individual's preference.

It is yet another object of the present invention to provide an Internet-based radio or music playing system that is biased according to each user's preferences.

It is yet another object of the present invention to provide a means by which song playlists may be generated for such an Internet radio.

It is an object of the present invention to provide copyright-compliant media streams for Internet and other networked systems broadcast These and other objects and advantages of the present invention will be apparent from a review of the following specification and accompanying drawings.

BRIEF DESCRIPTION OF THE APPENDICES

The following appendices are incorporated herein by this reference thereto.

Appendix 1 is an excerpted text listing of a playlist generated in conformance with the present invention.

Appendix 2 is a source code listing for one embodiment of the present invention.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As mentioned above, use of the term "radio," "music," and the like includes any recorded datastream content, including music, videos, recorded sports events and concerts, and the like.

Figure 1:
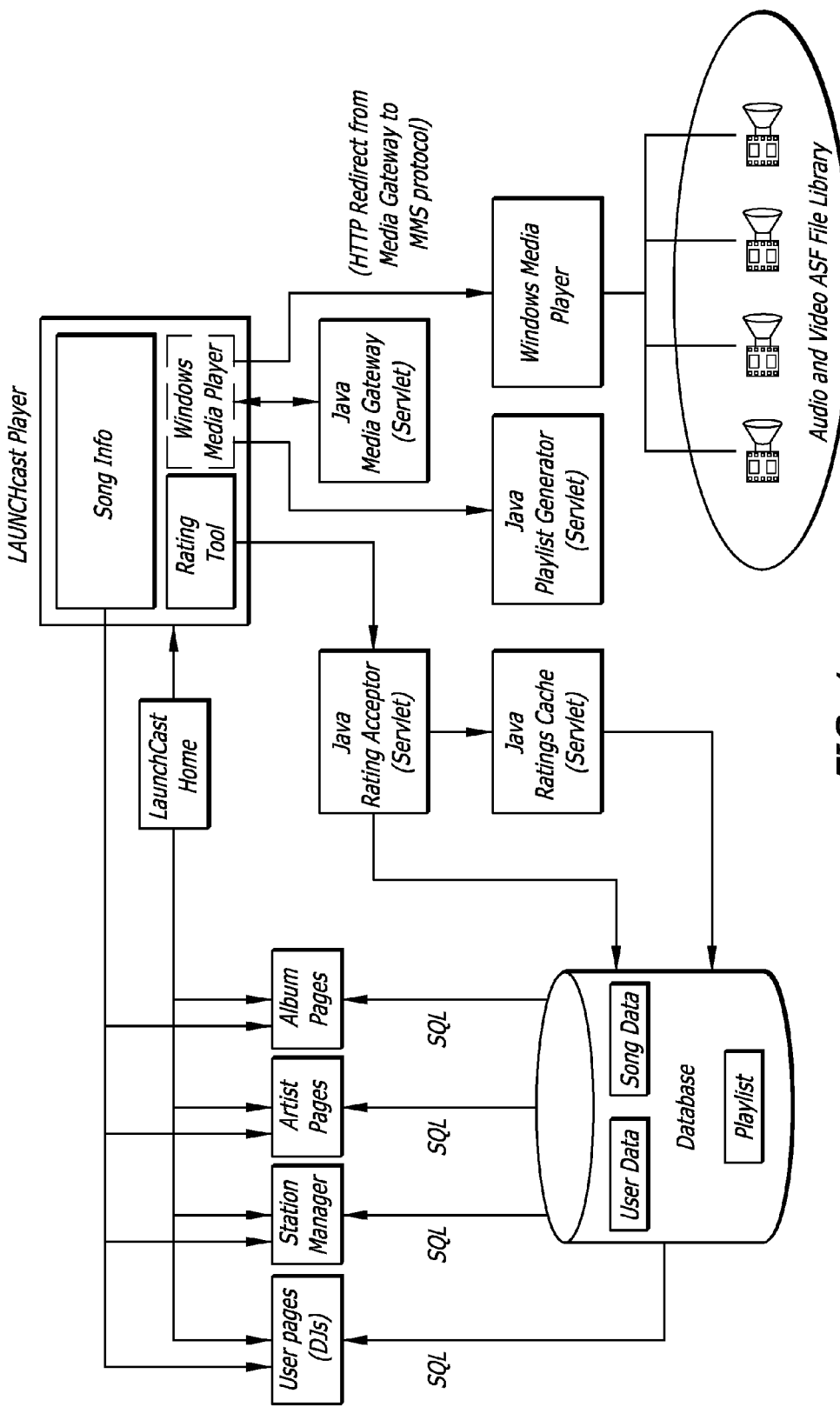
FIG. 1 is a schematic view of the system architecture used to achieve one embodiment of the present invention.

In FIG. 1, the general structure of the present system is shown where the LAUNCHcast Player provides user feedback and indication of song preference through Java Servlets and JavaScript code. In one embodiment, a Windows Media Player may provide the interface allowing the audio and/or video broadcast to take place at the user's computer. Other media players now known or developed in the future may also suffice and operate to good advantage. Mentioned use of the Windows Media Player system is to be considered as indicating any appropriately functioning media player. Song or video information is available through both the player and the accompanying data window.

Referring now to FIG. 1, the architecture and system structure of the Internet radio and broadcast method of the present invention is shown in schematic form. The system 100 is generally focused upon the player 102. The player 102 is the component that the user sees and is ultimately the arbiter of the media datastream service provided by the present invention. As shown in FIG. 1, the player 102 has a song information section 104, a rating tool 106, and a player 108. For this last component, the player 108 is indicated as being a Windows Media player. However, other media players can also be used to good advantage in order to achieve the present invention.

Through its components, the player 102 is linked or associated to a number of other sources of information and programs, including Java or other servlets. The present invention, when implemented in software, may be so implemented using Java-family of computer program languages. A servlet is Java programming that runs as a part of a network service, such as an HTTP server, in response to requests from clients. In this case, the client can be considered to be the player 102 while the HTTP server can be the servers for the database 160 and the media content library 180.

At a center of the present invention is the player 108. The player 108 allows the content to be broadcast to the individual user and serves as means by which the user can enjoy such content. In addition to being linked to the media database 180, the player 108 is also in communication with a media gateway servlet 120 and a playlist generator servlet 122. As discussed in more detail below, these two servlets provide the player the ability to play streaming media in conformance with the present invention.

The rating tool 106 is coupled to the database 160 via a rating acceptor servlet 130 and a ratings cache servlet 132. As indicated in FIG. 1, the rating acceptor servlet 130 and ratings cache servlet 132 are also in communication with one another, as set forth in more detail below.

The song information component 104 of the player 102 may provide links to other information available through the database 160 or otherwise. For example, the song information tool 104 may provide links to other user pages 140, a station manager 142, provided home pages of various artists 144, as well as links to album pages 146 of such artists or otherwise. Additionally, a central homepage 148 may be present that allows travel or linking to any or all of available pages or services.

Note should be taken that the database 160 is not necessarily the home for the media library 180. In fact, according to present technology, it may be more advantageous to provide some means by which high-speed access can be provided to the media library 180. By separating the database 160 from the media library 180 faster and better service may be provided to users so they may enjoy the content of datastream better. Certain infrastructures may allow for offsite residence of the media contained in the media library 180. Pointers or other indicators to such information in an indexed or other form can thereby provide the link necessary to deliver the preferred or indicated content by the user from the media library 180 to that same user.

As shown in FIG. 1, the database 160 may hold a variety of types of information, including: user data 162, playlists 164, and song data 166. Such information is stored by the database 160 and updated by the servlets as set forth in the present invention, including the user code set forth in Appendix 2.

Figure 2:
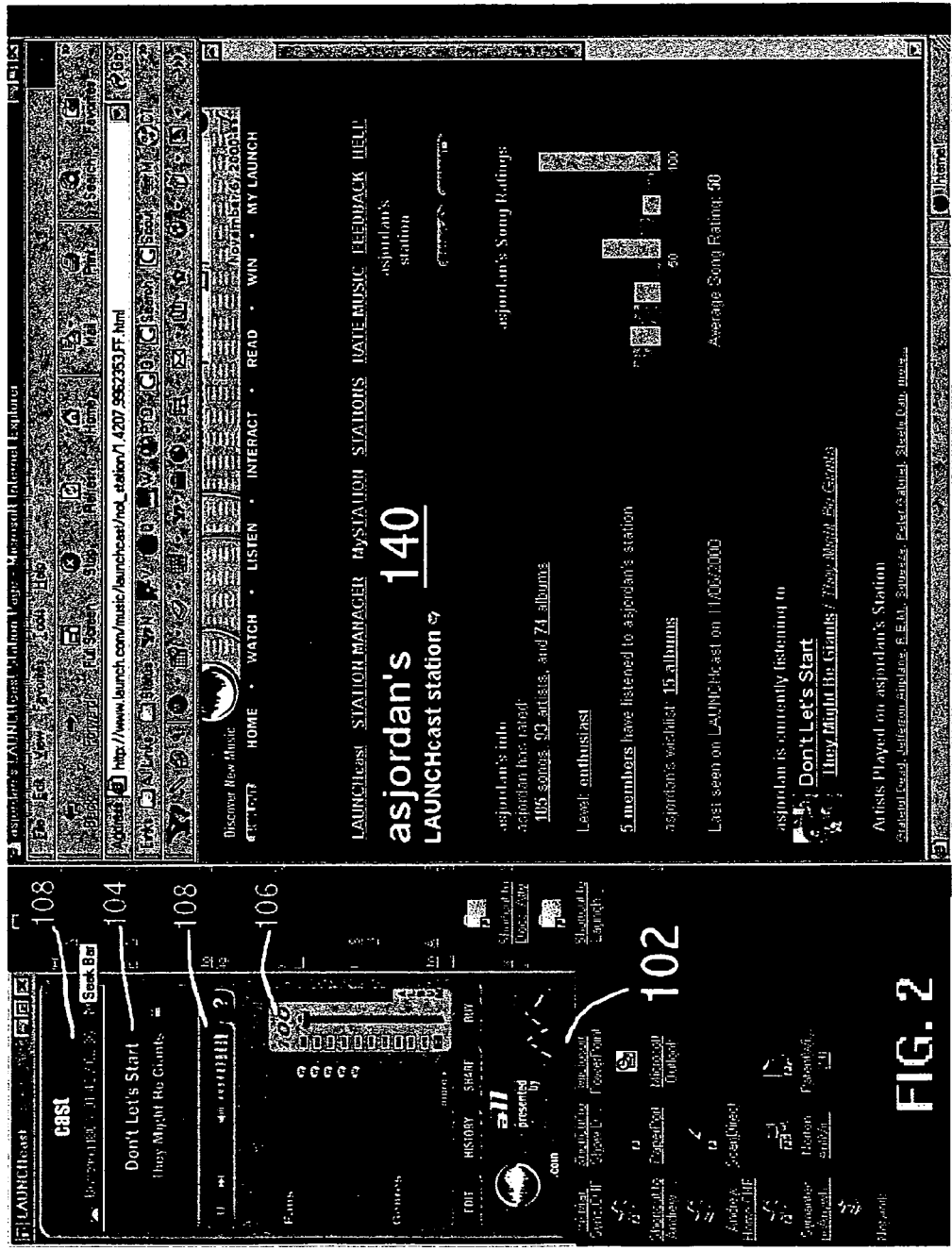
FIG. 2 is a screen shot showing a computer desktop with the audio player and user homepage for the present invention.

In FIG. 2, the player, or playback, window 102 is shown and is highly interactive with several embedded hyperlinks. In the upper right-hand corner of the playback window 102, the indication of "asjordan" is made. By clicking on this link, more information about the current station may be given and/or the ability to change such station. The user's page 140 may be activated and shown upon clicking the username link. In the right center of the playback window, a "RATE IT" window indicator that is the rating tool 106 is given, allowing the individual to rate the current "SONG", the "ARTIST" performing the current song, and/or an "ALBUM" containing the song. Below the "RATE IT" indicator, hyperlinks to "RECENT SONGS", "BUY", and "STATION MANAGER" are present allowing the user to travel to those destinations and either learn more information, purchase or review purchasing information about the current album being played, as well as access the station manager for the present invention.

Below the song information window 104, icons are given for Play/Pause, Skip This Song, Skip This Song and Never Play It Again ("Delete"), and a Volume control. The question mark ("?") shown below the "Song Information area" window is a hyperlink to a Help file for the playback window 102 and the Internet Radio system of the present invention. These icons are also shown in the other playback window Figures, such as that for the video playback user interface/client 102 shown in FIG. 3.

Figure 3:
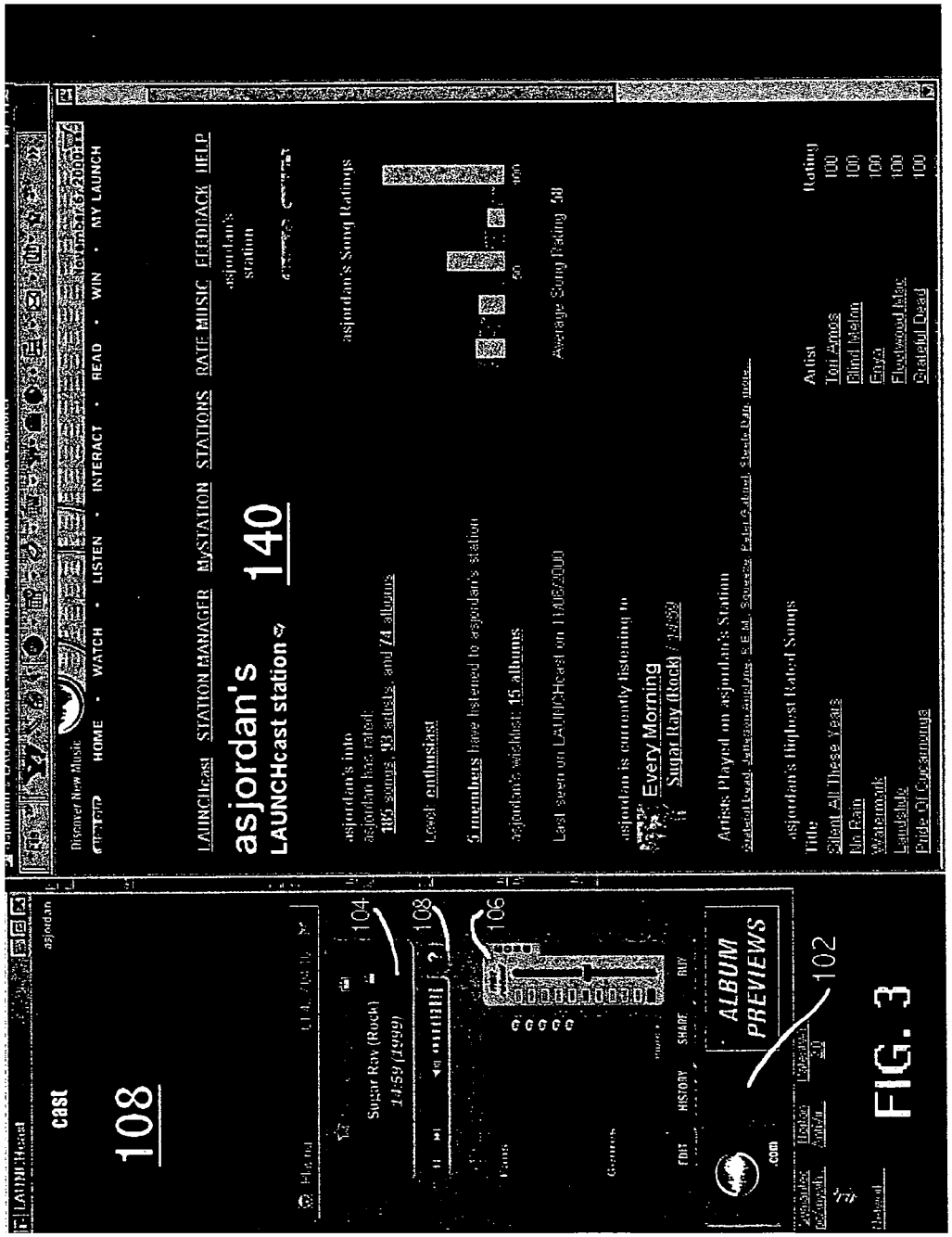
FIG. 3 is a screen shot showing a computer desktop with the video player and user homepage for the present invention.

FIGS. 2 and 3 show a desktop display of the system 100 in action from the user's point of view. A tool tip may be given when the cursor hovers over the song title. The same may be similarly true for the artist and the album currently playing. Note should be taken that just as the song rating indicator is highlighted and active in the middle right section of the playback window, the song title is highlighted in the upper portion of the playback window.

Additionally, the left and center middle portion of the playback window provides information regarding fans who have strong positive feelings about the present song, artist, and/or album, as well as an average rating for all users or some subset of users on the system.

FIGS. 2 and 3 show small balloons on the right-hand side of the central dark area across from the "Fans." These balloons may have a letter "W" inside of them to indicate another listener is currently online and can be engaged via the instant messaging ("whisper") function. FIGS. 2 and 3 also show graphic information that may be used for advertising or other hyperlinks. In generating the playlist of the present invention, the user can be informed as to why a particular song was picked.

For other links and presentation of information in the player 102, a tool tip may be presented when the cursor hovers over an area. A tool tip is a small window providing succinct information about the item under the cursor when the cursor hovers over that item.

When the system 100 is updating and obtaining a new data stream from the system for the user, a display may be given to the user to indicate ongoing activity of the playback system. Such visual activity in the form of animation assures the listener/viewer that the short span of silence, or "dead air," following a song is only temporary and that a new song will soon play. Generally, in order to promote interactivity and to take advantage of the new media that the Internet provides, the windows shown in the FIGS. 2 and 3 contain ample internal hyperlinks that lead to web pages providing information regarding music, artists 144, and/or their works 146, web pages regarding other users of the system (as DJs or otherwise) 140, and/or web pages regarding the user's control of the system (preferences, etc.) 142.

The default paradigm for the user interface/player 102 is to allow the user the greatest degree of freedom in expressing preferences and in obtaining that preference information regarding music artists, and their publications/albums. In this way, the user's experience is enhanced as he or she hears more of the music he or she likes. Access to purchasing web sites is also made available where users may purchase artists' works.

In implementing the present invention in software, the accompanying source code (Appendix 2) may be used to achieve the present invention. Such code is subject to copyright protection and is owned by LAUNCH Media, Inc. of Santa Monica, Calif.

The generation of a proper playlist combining available user ratings and a media database forms an important part of the present invention. One such playlist as generated by the present invention is shown in Appendix 1 and is an excerpted form for purposes of explanation. Entries in the playlist have been removed so that the playlist may better serve the explanatory purposes herein without undue length or the sacrifice of sufficient detail.

Playlist generation occurs when a user launches his client player 102. A Windows Media or other player 108 is embedded in the user's client player 102. The player 108 opens a call to the playlist generator servlet 122 as executed by the PlaylistGeneratorServlet routine (Appendix 2, page 158). The expected output from this HTTP call is an ASX playlist file, which in the present invention is list of pointers to a script that reads the actual playlist data object from the database 160.

The playlist generator servlet 122 parses the particular parameters for this ASX playlist as follows:
  Object: GeneratorParameters;
  userID: (required) the user for whom the playlist is generated;
  djID: (default is userID) the user whose profile will be used to generate the playlist;
  moodID: (default is none) a mood which is a subset of a profile may be indicated and used to alter the preferences in the playlist and under which to listen (optional); and
  bandwidth: (default is 28.8 k, if not read from the user's preferences in the database) the bit rate at which the user wishes to listen.

The database 160 with the playlist database 164 is checked for an existing playlist by PlaylistStatus (Appendix 2, page 192). If a playlist already exists, it can be used it if all the following are met (and PlaylistStatus.isStale( ) returns false):
  all of the parameters (userID, djID, etc) match;
  there are more than 8 songs left;
  the newRatingsCount (counter of new personalization data since last refresh) is less than 15; and
  the playlist is less than a week old.

If all these conditions are met, the dates for the last time the user listened to an ad, news bit, and tip may be reset and the playlist may be resaved. The ASX file is written out and media player begins to execute by making requests to the media gateway 120 to play music.

If the old playlist cannot be used, a new one is created with the playlist generator via PlaylistGenerator.create( ).

The first step is to retrieve the user's preferences via PlaylistGenerator.getOptions( ). In response the following options are returned:
  unratedQuota: how much new (not rated) music they want hear in their playlist. The options here are 90, 80, 70, 50, 40, 30, and 20 percent. The default is 50 percent.
  explicit lyrics: Does this user want us to play music with explicit lyrics? True or false.
  bandwidth: if the bandwidth is not already specified in the generator parameters, it is read from stored data. Currently, bandwidth options include 28.8, 56, and T1/LAN. The default is 28.8 if a valid setting of "none" is found in the database.

A list of all the possible songs available for play (via PlaylistGenerator.gatherMedia( ) as well as some other data about those songs is obtained. This is generally done using multiple threads running at the same time for better performance. The list of songs is held in hashtable (as via the Population subroutine (Appendix 2, page 198)).

The database 160 is first called to load a history of all the songs played for the user in the last 30 days. This is stored in the database as a long string, formatted as: "<Date>=<songID>, <Date>=<songID>, . . . ." For performance reasons, reading one string from the database is faster than reading potentially several thousand rows individually from the database. Dates older than 30 days are ignored and the last time a song was played overwrites previous plays of a song. Each time a song is played via the media gateway 120, this string is appended.

After the history loading is complete, a random integer is picked from 1 to 10. If the value is 1, the date and songID string is recreated and rewritten to the database. This cleans up the string by removal of songs that were played more than 30 days ago as well as duplicate entries for the same songID.

The history loads as a thread, and another database call is made to get the user's, or DJ's, list of subscribed DJs, genres, and radio stations (via PlaylistGenerator.getSubscriptions( ) for the specific mood requested. The result of this call is three lists called DJs, genres, and stations.

Once the subscriptions are available, the ratings are obtained via GetRatings. This is also done in a thread. The song hashtable, another hashtable that contains Artist and Album ratings (ItemsProfile), the DJ, and the list of subscribed DJs are all passed to the GetRatings method routine.

A retrieval list of users whose ratings are to be retrieved is compiled using the subscribed DJs and the DJ requesting the playlist. A request is made to the ratings cache to retrieve all these ratings via RatingsCache.getRatings( ).

When the playlist generator has all the ratings, it is ready to assemble them into categorized data structures, based on the properties of each rating. It iterates through all the ratings and stores them in the following manner. If the ID of the user is the DJ and the rating is 0 (an 'X' in the end-user interface), the song is added to song hashtable (via Population) as an "Excluded" type, meaning that song should never be played. The rating is also added to the average rating for songs by that artist. If the rating is not 0, the song information cache is immediately checked via SongInfoCache.get( ) for data about this song. If the data does not exist in the cache, it is a song that was rated, but is not available for play (as possibly not encoded), and the song is immediately marked as an "Excluded" song.

If all of the above tests pass, the song is added to the song hashtable with a type of "Explicit". The rating for the song is included in the calculation of this DJ's average rating of songs by the artist.

Each song that is rated by subscribed DJs is added to the song hashtable. The subscribed DJ's rating for the song is included in the calculation of the subscribed DJs' average rating for this song.

For albums, the ratings profile is obtained from the item rating profiles. If a ratings profile for an album does not yet exist, then the data regarding the album is retrieved and a ratings profile is created.

If the rater is the user requesting the playlist, the rating for this item is set to the user's rating. However, if the rater is a subscribed DJ, the rating is added to the DJ's average for this album.

For artists, the rating procedure is the same as for albums, except any ratings made for the artists listed as "Various Artists", "Soundtrack", or "Original Soundtrack" are discarded or ignored in the relevant calculations.

The top 1000 most popular songs (via PlaylistGenerator.getPopular( )) in the bandwidth type specified may be added to the song candidate hashtable. This popular list is maintained in the song information cache. Before each song is added to the song hashtable, inspection is made to see if the song is already in the candidate hashtable (perhaps put there by another query). If so, inspection is made to make sure that the song is not of type "Excluded", or the song is discarded. If the song is added to the song hashtable, it is added under the type "Unrated".

A maximum of 5000 songs are picked randomly (via PlaylistGenerator.getRandom( )). Initially, a count is made of the number of songs contained in each and all of the genres a user has selected (via SongInfoCache.countInGenres( )). Songs may be in multiple genres. The number of songs is then divided by the total number of songs in the song information cache. If the result is less than 5%, songs are picked directly from a list of songs only in those genres. Otherwise, songs can be picked randomly from all available songs. This calculation may be performed to avoid the situation where a user has selected a small number of genres and picking songs randomly will return only a few songs that are available or allowable for play when considering their genres.

In order to select songs only from selected genres, a determination is made of the total number of songs to pick (via totalToPick) from the lesser of 5000 and the total number of songs in the selected genres. For each genre, a copy of the list of songs in that genre is obtained from the song information cache (via SongInfoCache.getInGenre( )). The number of songs to pick from each genre is determined from the following formula: songs to pick=totalToPick*(number of songs in this genre/total number of songs in the selected genres).

The determined number of songs is picked and attempts are made to add the songs to the song hashtable with a type of "Unrated". A song is not added if it is already in the hashtable.

In order to select from all songs, a song is randomly selected 5000 times. Each time, attempts are made to add the song if it is not already there as picked, as described above. Once the process finishes adding random songs, all the ratings for the songs are retrieved as are all the dates of when the songs were played for the user. The explicit, implicit, and unrated lists built in the last step are taken and ordered in descending order by score, or rating, using a quicksort or other algorithm.

The number of songs to pick from each list is determined. For example, if the size of a playlist is 50 songs, the following may occur. If the user is listening to his own station, the following formula may be used: if the user's list of explicit and implicit songs is smaller than 100 songs, 90% of the songs must be picked from the unrated list to avoid playing the user's rated songs too much. The user's unrated quota may, then, be set to 90. Otherwise, an unrated quota may be used from the user's stored options.

Under some circumstances the maximum number of songs available from the explicit and implicit song lists is calculated as follows:

$$maximumRated = playlistSize * (100 - unratedQuota) * 0.01.$$

The maximum number of songs available from the explicit list may be calculated as:

$$MaximumExplicit = \text{number of songs in the explicit list} * 0.20.$$

A number of songs to pick from the explicitly-rated list may then be:

$$explicitToPick = playlistSize * (100 - \text{unrated quota}) * 0.01 * (\text{number of songs in the explicit list} / \text{sum of explicit and implicit songs}) * 3);$$

From this the number of implicit songs is simply:

$$implicitToPick = maxiumumRated - explicitToPick.$$

Confirmation can be made to ensure that more explicit songs have not been picked than indicated by maximumExplicit and that no more implicit songs have been picked than those that are in the implicit list. The number of unrated songs is then: playlistSize−(explicitToPick−implicitToPick)

If the user is listening to a station other than his own and the number of songs in the explicit and implicit list total greater than 200, then the following calculations are made:

explicitToPick=Minimum(playlistSize*0.50, 20% of explicit songs); and implicitToPick=Minimum(playlistSize, # of implicit songs)−explicitToPick If, for some reason, a sufficient and/or playlistSize number of songs is not obtained from this calculation, a third of the songs is picked from each of explicit, implicit and unrated songs with a check to ensure that not more than 20% of the songs on the rated and unrated lists are picked. As a fallback measure if none of the methods above used to calculate the number of songs to pick worked, the songs are selected as a third of the playlistSize from each list, making sure not to pick more than 20% of the rated and unrated lists.

A list of albums and artists from and by which songs have been played for this user in the last 3 hours is copied or otherwise made available to the process set forth herein and the songs for this playlist are picked via PlaylistGenerator. pickSongs( ). A list of all the picks needed is made (via PickList). For example, if there is a playlist of 50 songs, the list may contain 10 entries for explicit songs, 20 for implicit songs, and 20 for unrated songs.

While there are still songs to pick, iteration is made through the following cycle:

a. randomly pick a song list type (explicit, implicit, unrated) with a probability based on the proportion of songs to come from each list;
b. pick a random song index from that list (which has already been sorted in descending order of score), based on the following formula (via SongGroup.pick-Random( )):
sizeOfList=the number of songs in this list;

random=a randomly-chosen number between 0 and (sizeOfList−1)+0.01; and index of song to pick=((rand^7)/sizeOfList−1^7)* (sizeOfList−1)).

This formula allows songs to be picked somewhat randomly, while guaranteeing a high probability that the song picked will come from highest scored. The higher the ranking of the song in the score matrix, the higher the probability it will be picked. This algorithm scales well for any size of list because it is rank-based, not just score based.

The song at that index is removed from the list. If for some reason a valid song is not obtained (possibly the song list already exhausted), another song is added to the list of types to pick of this type.

Once a song is picked, its album and artist information are obtained.

If the artist is not a "Various Artist" and the sum of the number of songs played by this artist and already picked for this playlist by this artist is greater than or equal to 3, this song cannot be played under the RIAA (Recording Industry Associates of America) and/or DMCA (Digital Millennium Copyright Act) rules. Other rules may also be implemented in the present invention to accommodate statutory and other rights and/or restrictions.

The song is marked as "rejected" and another song is added to the list of songs to pick from the same list the rejected song was picked from. The same test is performed for albums, with the maximum played, for example, being 2. If the song was picked successfully and was within legal or other boundaries, the number of songs picked from this album and by this artist is incremented. The song is added to the final list of songs for the playlist and the order in which the song was picked for the playlist is marked, or noted.

If, for some reason, a playlistSize number of songs is not obtained, the existing playlist is deleted and popular songs are added to the song hashtable, and the song lists are re-sorted and re-picked ignoring the user's genres selections.

The picking of news clips is done simply by picking a specific number of unique news items that are in the specified bandwidth format. A list of available news clips is stored in the song information cache. Ads may be picked in the same way as news clips are picked. However, a difference may be present in the different number of ads to pick. Tips may also be picked in the same manner as news clips, with a different number of tips to pick.

The order of the songs may be randomly shuffled in the playlist and the playlist may be serialized and saved to the database. Finally, the ASX file may be returned to the player 108.

Every 5 minutes, the player 102/108 "pings" the Playlist Generator 122. If the playlist is stale or has 8 songs or less left in it, the playlist generator regenerates the playlist and replaces the one previously saved in the database.

As an additional enhancement to the present invention, playlists from commercial and other radio stations throughout the United States, and elsewhere, are made available so that playlists may be affected by such radio stations and by popularity of particular musical works.

In achieving the Internet radio of the present invention, a rating acceptor 130 in the form of the RatingWidgetServlet routine (Appendix 2, page 222) takes HTTP requests to rate and gets ratings for songs, albums, and artists. When a rating is saved, it written to the ratings database and if the user who rated the item is designated as being in the ratings cache, the rating change is added to the queue of ratings updates.

Once every minute, the ratings updates are sent to all the ratings caches that have registered their IP address in the database. Every hour, the list of ratings caches are retrieved from the database. Every ten minutes, the list of users in the cache are retrieved from the database.

The song information cache is implemented through the SongInfoCache routine (Appendix 2, page 265) and may be a large in-memory cache of relatively static data that is used in playlist generation. It may include a list and hashtable of all songs which includes identifying numbers, media formats available, average rating, artist and album information, explicit lyrics mark, genres the song is in, and radio stations that play the song. Also, other information may be included in the song information cache, including: a hashtable of artist information; a hashtable of album information; a list and hashtable of all ads including identifying numbers and media formats available; a list and hashtable of all news clips including identifying numbers and media formats available; a list and hashtable of all audio tips including identifying numbers and media formats available; a lists of the 1000 most popular songs in each media format; lists of all songs in each genre; and a cache of frequently-accessed ratings profiles. This last cache is seen in the RatingsCache 132 routine (Appendix 2, page 211). The song information cache is completely rebuilt once a day from the database.

The ratings cache caches the entire ratings profile for the top 100 users who are known to be accessed frequently. The ratings cache is implemented through the RatingsCache routine (Appendix 2, page 211). On startup, the ratings cache registers its IP address in the database to subscribe to ratings updates. These users are typically DJs (users with broadcasted or subscribed ratings) that have many subscribers, or users who simply use LAUNCHcast frequently. Each ratings cache recalculates the most frequently-accessed users and writes it to the database every 8 hours. At that time, the entire cache is discarded and reread from the database to erase any lingering corruption. Each ratings cache checks the database every 10 minutes for changes in the list of users to be cached and updates the ratings cache as appropriate.

Note should be taken that many of the parameters set forth herein are discretionary and advisory. Consequently, those properly and legitimately implementing the present invention may alter such parameters, such as when events occur and event timing as above, according to system operation preferences.

For each user who is not in the ratings cache, their ID is appended to a list of users whose profiles need to be retrieved from the database 160. Users who have been added to the cache recently have their profiles added to the list of ratings to be returned to the PlaylistGenerator 122 routine (Appendix 2, page 158). All non-cached users' ratings are retrieved from the database 160, are appended to the list of ratings, and are returned to the PlaylistGenerator 122. The album and artist ratings are retrieved in a separate query from the song ratings. Each runs in its own thread in parallel for optimal performance.

The media gateway 120 is a Java servlet that brokers the relationship between the end user's (Windows Media) Player 108, the database 106, and media library, or Windows Media Server, 180 and logs all media access. The MediaGatewayServlet routine (Appendix 2, page 112) performs this function. Because the client's Windows Media Player playlist (.sax file) does not contain any information about the actual songs or ads in the user's playlist, the media gateway 120 contains the logic described below to redirect the user's player to the correct media address on the media library 180.

For security reasons, the media gateway 120 may check to see that the client 102 is accessing it from the Windows Media Player client 108 (and not a web browser or other application). If not, it may redirect the user to an error media file. The media gateway 120 then pulls the user's ID off the query string and retrieves that user's playlist object from the database 160. The gateway 120 inspects timestamps in the user's playlist object that indicate when the user last heard an ad, tip, song or other media item and determines if it is time to insert an ad, tip, or news item in the datastream, or just play the next song.

If the user has not heard an ad, for example, for a predefined period of time, the media gateway 120 resets an ad timestamp and retrieves an ad path from the user's ad playlist and passes that MMS (Microsoft Media Server) redirect instruction/address to the end user's Windows Media client 108. If no ad is available, the process continues and plays the next song in the user's playlist. If it is not time to play an ad, the timestamp is checked to see if it is time to play a tip. The process then follows the same logic, above, for ads to retrieve and play a tip, instead of an ad. If it is not time to play an ad or tip, the timestamp is checked to see if it is time to play a news item. The process then follows the same logic as for ads to retrieve and play a news item.

If it is not time to play an ad, tip, news item, or other stream (the usual case), the media gateway 120 retrieves the path of the next song in the playlist and returns that address via an MMS redirect to the client's Windows Media Player 108. In all cases, the mediaID of the ad, tip, or song played is logged in the database 160 under that user's ID. This logging information is used to display what the user is listening to on the user's station page and under the "Who's Listening" page. These pages may be associated with the central home page 148 in a manner similar to that of the user pages 140 as history data in the playlist generator, and in calculating a Top 100 chart for the most popular songs and/or streams.

While there may be some preference for an "on-demand" service such that individuals may pick their own radio playlists, the element of randomness and pleasant surprise is inherent in the present invention. Additionally, statutory requirements prevent users from turning the Internet into their own home stereo system. "On-demand" service is generally prevented by statute and may be a violation of copyright. Consequently, any statutory regulations, such as the Digital Millennium Copyright Act (DMCA), and other limitations can be programmed automatically into the present invention. In so doing, the present invention complies with all applicable law and delivers to the user a musical experience generally aligned with his or her preferences.

Many users often listen to music while doing programming or the like. Such music can now be delivered over the Internet via the user's very own radio station through the present invention. Additionally, users may select other individuals or DJs, to influence their musical playlist just as the user does. The DJ, online or otherwise, becomes an additional factor in influencing the user's preferences and playlist. Some individuals may act as real DJs, serving to provide content to an audience of subscribers through the Internet. Programs of special interest may also be developed and subscribed to by listeners using the present invention. Through the heavily hyperlinked (but easily understandable) interface set forth in the Figures and described above, a user may establish musical (or other data stream) preferences. In establishing such preferences, the music played to the listener is tailored to that listener and provides an enhanced musical experience on an individual basis.

What is claimed is:

1. A method comprising:

accessing a database of data streams by at least one server to create a plurality of personalized internet radio stations for broadcast to a plurality of users, each of said personalized internet radio station for broadcast to one individual user of said plurality of individual users and having an individualized playlist that is created exclusively for said individual user and identifying at least one data stream selected from said database for broadcast as said individual user's personalized internet radio station;

selecting, by said at least one server, said at least one data stream for said individualized playlist, said at least one data stream of said individualized playlist for broadcast over a computer network to a computer for said individual user as said individual user's personalized internet radio station, said at least one data stream being selected from said database according to a selection method performed by said at least one server to create said playlist of data streams exclusively for said individual user's personalized internet radio station using said individual user's preferences for data streams, said selection method performed by said at least one server being influenced by said individual user's preferences for data streams but not controlled by said individual user's data stream preferences so as to prevent an on-demand selection of data streams by the at least one server for broadcast to said individual user based on said individual user's data stream preferences;

transmitting, by said at least one server, said at least one selected data stream to said computer as said personalized internet radio station broadcast for said individual user via said network;

receiving, by said at least one server, feedback via said network, said feedback expressing a preference of said individual user regarding at least one of said transmitted at least one data stream; and reutilizing, by said at least one server, said selection method in response to receiving preference of said individual user, said reutilizing said selection method performed by said at least one server comprising selecting one or more of said data streams for said playlist for broadcast as part of said individual user's personalized internet radio station, said selecting being made in accordance with said individual user's data stream preferences, including said received preference, and limiting said individual user's control over selection of particular data streams from said database to prevent said on-demand selection of data streams.

2. The method of claim 1, further comprising:
performing said step of reutilizing by said at least one server to update said individualized user's playlist of data streams using said individual user preferences while a data stream selected for said personalized internet radio station is being experienced by said individual user at said computer.

3. The method of claim 1, the steps further comprising:
receiving by said at least one server via said network feedback expressing preferences from sources other than said individual user.

4. The method of claim 3, wherein the step of receiving preferences from sources other than said individual user further comprises:
receiving by said at least one server via said network feedback expressing preferences from the group consisting of other users, commercial radio stations, and lists of popular songs.

5. The method of claim 1, further comprising:
informing said individual user generally regarding said database and said data streams;
querying said individual user as to initial individual user preferences and then performing said step of selecting at least one data stream from said database to generate an initial transmission list of data streams, said initial transmission list being selected using said initial individual user preferences and said selection method.

6. The method of claim 1, wherein said data streams are selected from the group consisting of songs and videos.

7. The method of claim 2, wherein a data stream selected for said playlist is removed from said playlist after it is broadcast to said computer.

8. The method of claim 7, wherein said data stream removed from said playlist is listed on a transmitted data stream list.

9. The method of claim 1, wherein said selection method taking into account sound recording performance restrictions in data stream selection.

10. A system comprising:
a database of media content data streams;
at least one server computer connected to a computer network, said at least one server computer accessing said database to create a plurality of personalized internet radio stations for broadcast to a plurality of users, each of said personalized internet radio station for broadcast to one individual user of said plurality of individual users and having an individualized playlist that is created exclusively for said individual user and identifying at least one data stream selected from said database for broadcast as said individual user's personalized internet radio station;

a data stream controller coupled to said at least one server computer, said data stream controller transmitting media content data streams to said individual user at a computer connected to said network according to a selection program performed by said at least one server computer to select data streams for broadcast over said computer network to said computer as said individual user's personalized internet radio station;

said selection program used in selecting media content data streams for said individual user's playlist, said individual user's playlist for transmission to said computer for said individual user via said data stream controller as said individual user's personalized internet radio station, said selection program receiving feedback via said computer network indicating a preference corresponding to at least one of the media content data streams from said individual user, said selection program performed by said at least one server computer being influenced but not controlled by said individual user preferences, said selection program using said individual user preferences to select data streams to be experienced at said individual user computer and limiting said individual user's control over selection of data streams from said database to prevent an on-demand selection of said data streams by said at least one server computer for transmission to said individual user based on data stream preferences.

11. The system of claim 10, wherein said computer network comprises the Internet.

12. The system of claim 10, wherein said database is a song database and the data streams are songs.

13. The system of claim 10, wherein said database is a music video database and the data streams are music videos.

14. The system of claim 10, wherein said media content data streams are to be experienced via an electronic media player.

15. The system of claim 10, wherein said selection program modifies said playlist of data streams for transmission to said individual user according to said individual user preferences.

16. The system of claim 10, said selection program taking into account sound recording performance restrictions.

17. An apparatus comprising:
at least one server computer that executes code to generate a plurality of personalized internet radio stations for broadcast to a plurality of users, each of said personalized internet radio station for broadcast to one individual user of said plurality of individual users and having an individualized playlist that is generated exclusively for said individual user and identifying at least one data stream selected from said database for broadcast as said individual user's personalized internet radio station, said at least one server computer to further provide:

a rating tool, said rating tool receiving individual user preferences regarding one or more data streams played at a computer for said individual user by a media player, said individual user preferences comprising said individual user's ratings associated with said one or more data streams; and a playlist generator, said playlist generator generating said playlist by identifying data streams to be experienced by said individual user as said individual user's personalized internet radio station using said media player, said playlist generator selecting data streams for inclusion in said playlist according to said individual user preferences received from said individual user, and limiting said individual user's control over data stream selection to prevent an on-demand selection of a data stream by said at least one server computer for broadcast to said individual user based on data stream preferences.

18. An apparatus of claim 17, further comprising:
said playlist generator further selecting data streams in accordance with sound recording performance restrictions.

19. A method comprising:
accessing a database of data streams by at least one server to create a plurality of personalized internet radio stations for broadcast to a plurality of users, each of said personalized internet radio station for broadcast to one individual user of said plurality of individual users and having an individualized playlist that is created exclusively for said individual user and identifying at least one data stream selected from said database for broadcast as said individual user's personalized internet radio station;
selecting, by said at least one server, at least one data stream for said individualized playlist, said at least one data stream of said individualized playlist for broadcast over a computer network to a computer for said individual user as said individual user's personalized internet radio station, said at least one data stream being selected from said database according to a selection method performed by said at least one server to create said playlist of data streams exclusively for said individual user's personalized internet radio station using said individual user's preferences for data streams, said selection method performed by said at least one server being influenced by said individual user preferences for data streams but not controlled by said individual user's data stream preferences so as to prevent an on-demand selection of data streams by said at least one server for broadcast to said individual user based on said individual user's data stream preferences;
transmitting, by said at least one server, said at least one selected data stream to said computer as said personalized internet radio station broadcast for said individual user via said network;
receiving, by said at least one server, feedback via said network, said feedback expressing a preference of said individual user regarding at least one of said transmitted at least one data stream; and
reutilizing, by said at least one server, said selection method in response to receiving said preference of said individual user, said reutilizing said selection method comprising selecting one or more of said data streams for said playlist for broadcast as part of said individual user's personalized internet radio station, said selection being made in accordance with said individual user's data stream preferences, including said received preference, taking into account user input identifying those data streams that are to be excluded from being selected for transmission to said individual user computer, and limiting said individual user's control over selection of particular data streams from said database to prevent said on-demand selection of data streams.

20. The method of claim 19, further comprising:
performing said step of reutilizing by said at least one server to update said playlist of data streams using said individual user preferences while a data stream selected for said personalized internet radio station is being experienced by said individual user at said computer.

21. The method of claim 19, the steps further comprising:
receiving by said at least one server via said network feedback expressing preferences from sources other than said individual user.

22. The method of claim 21, wherein the step of receiving preferences from sources other than said individual user further comprises:
receiving by said at least one server via said network feedback expressing preferences from the group consisting of other users, commercial radio stations, and lists of popular songs.

23. The method of claim 19, further comprising:
informing said individual user generally regarding said database and said data streams;
querying said individual user as to initial individual user preferences and then performing said step of selecting at least one data stream from said database to generate an initial transmission list of data streams, said initial transmission list being selected using said initial individual user preferences and said selection method.

24. The method of claim 19, wherein said data streams are selected from the group consisting of songs and videos.

25. The method of claim 20, wherein a data stream selected for said playlist is removed from said playlist after it is broadcast to said computer.

26. The method of claim 25, wherein said data stream removed from said playlist is listed on a transmitted data stream list.

27. The method of claim 19, wherein said selection method taking into account sound recording performance restrictions in data stream selection.

28. A system comprising:
a database of media content data streams
at least one server computer connected to a computer network, said at least one server computer accessing said database to create a plurality of personalized internet radio stations for broadcast to a plurality of users, each of said personalized internet radio station for broadcast to one individual user of said plurality of individual users and having an individualized playlist that is created exclusively for said individual user and identifying at least one data stream selected from said database for broadcast as said individual user's personalized internet radio station;
a data stream controller coupled to said at least one server computer, said data stream controller transmitting media content data streams to said individual user at a computer connected to said network according to a selection program performed by said at least one server computer to select data streams for broadcast over said computer network to said computer as said individual user's personalized internet radio station;
said selection program used in selecting media content data streams for said individual user's playlist, said individual user's playlist for transmission to said computer for said individual user via said data stream controller as said individual user's personalized internet radio station, said selection program receiving feedback via said computer network indicating a preference corresponding to at least one of the media content data streams from said individual user, said selection program performed by said at least one server computer being influenced but not controlled by said individual user preferences, said selection program using said individual user preferences to select data streams to be experienced at said individual user computer, taking into account individual user input identifying those data streams that to be excluded from being selected for transmission to said individual user computer, and limiting said individual user's control over selection of data streams from said database to prevent an on-demand selection of a particular data stream by said at least one server computer for transmission to said individual user based on data stream preferences.

29. The system of claim 28, wherein said computer network comprises the Internet.

30. The system of claim 28, wherein said database is a song database and the data streams are songs.

31. The system of claim 28, wherein said database is a music video database and the data streams are music videos.

32. The system of claim 28, wherein said media content data streams are to be experienced via an electronic media player.

33. The system of claim 28, wherein said selection program modifies said playlist of data streams for transmission to said individual user according to said individual user preferences.

34. The system as set forth in claim 28, said selection program taking into account sound recording performance restrictions.

35. An apparatus comprising:
at least one server computer that executes code to generate a plurality of personalized internet radio stations for broadcast to a plurality of users, each of said personalized internet radio station for broadcast to one individual user of said plurality of individual users and having an individualized playlist that is generated exclusively for said individual user and identifying at least one data stream selected from said database for broadcast as said individual user's personalized internet radio station, said at least one server computer to further provide:
a rating tool, said rating tool receiving individual user preferences regarding one or more data streams played at a computer for said individual user by a media player, said individual user preferences comprising said individual user's ratings associated with said one or more data streams; and
a playlist generator, said playlist generator generating said playlist by identifying data streams to be experienced by said individual user as said individual user's personalized internet radio station using said media player, said playlist generator selecting data streams for inclusion in said playlist according to said individual user preferences received from said individual user, taking into account individual user input identifying those data streams that are to be excluded from being selected for transmission to said individual user computer, and limiting said individual user's control over data stream selection to prevent an on-demand selection of a data stream by said at least one server computer for broadcast to said individual user based on data stream preferences.

36. An apparatus of claim 35, further comprising:
said playlist generator further selecting data streams in accordance with being in compliance with sound recording performance restrictions.

* * * * *